2,733,998
Patented Feb. 7, 1956

2,733,998
METHOD OF MAKING GLAZED PATTERN FABRIC

William W. Russell, East Providence, and Herman C. Allen, Saylesville, R. I., assignors to Sayles Finishing Plants, Inc., Saylesville, R. I., a corporation of Rhode Island No Drawing. Application June 8, 1953, Serial No. 360,358

14 Claims. (Cl. 117—11)

This invention relates to glazed pattern fabrics and to a method of finishing textile fabrics such as cellulosic fabrics to produce a fabric having a lustrous pattern finish, and pertains more particularly to the finishing of cotton fabrics to produce highly permanent lustrous glazed and embossed patterns thereon and to the fabrics so produced.

In the past fabrics having patterned glazed areas have been produced by printing a low polymer thermosetting resin in a pattern upon certain selected fabric areas, and then calendering at an elevated temperature to glaze and set the resin. Upon washing, the resin treated fabric areas remain glazed while adjacent fabric areas containing no resin lose their calendered glaze.

A serious disadvantage of the foregoing process and product arises from the weakening and tendering of the fabric which tends to occur, and which is especially troublesome on lighter weight fabrics, when the resin treated fabric areas which also must contain an acidic polymerization catalyst are subjected to simultaneous high temperature and heavy pressure in the glazing calender.

We have now discovered a fabric bearing a glazed or embossed pattern finish which is free from the disadvantages of the fabric produced by the previously known methods.

One object of the present invention is to provide a fabric having a calendered pattern which is permanent and resistant to washing and dry cleaning while at the same time preserving substantially the full strength of the underlying fabric.

Another object is to provide a fabric having upon its face a patterned protective coating of thermoset resin which serves to protect an underlying calendered finish.

Another object is to provide a method for coating selected areas of a fabric with a thermosetting resin and then causing the resin to set while substantially preventing any deleterious effect of the resin or the catalyst contained therein upon the underlying fabric.

Another object is to provide a fabric having a remarkably brilliant, lustrous, glazed or embossed pattern finish with sharply defined edges in marked contrast to adjacent non-lustrous, opaque and compacted or shrunken areas.

Other and further objects will be apparent from the description which follows.

In one of its aspects the present invention comprises calendering a fabric to produce a glazed or embossed finish, coating selected areas of the fabric in the desired pattern with a suitable thermosetting resin, curing the resin and subsequently treating the fabric with an aqueous medium to remove the calendered finish in areas free from the resin.

While a wide variety of fabrics may be employed in the present invention, it is particularly applicable to cellulosic fabrics such as cotton, linen, cellulosic rayons, particularly spun rayons, and mixtures of these with each other.

The term "calendering" as used in the specification and claims is used in its broad sense to include the operation carried out by rolling, chasing, frictioning, glazing, schreinering, embossing and beetling calenders and the like, and the term "calendered finish" includes finishes produced by any such operation.

In carrying out the present invention, it is desirable, although not essential, that the fabric, prior to calendering, be rendered absorbent by scouring, kiering, bleaching, mercerizing, or the like or by shrinking with an aqueous solution of caustic soda or other shrinking agents such as potassium or lithium hydroxide or the like. The fabric may be undyed, or may be dyed or printed in color. Following such treatment, and any washing step which may be employed, the fabric is dried on a tenter frame to a moisture content preferably between 10% and 15%, then calendered.

In one embodiment of the invention it is preferred to treat the fabric by coating or impregnating it with a mechanically deformable cellulosic material which is preferably formed in situ, being precipitated in and on the yarns of the fabric from a solution of cellulose in cuprammonium solution or in certain quaternary solvents or the like or preferably from a solution or dispersion of cellulose xanthate. Other cellulosic materials which are dispersible in and precipitatable as such from aqueous or aqueous alkaline media are also suitable for use in this step of the invention, such as cellulose ethers of a suitable degree of etherification, e. g., ethyl and propyl ethers of cellulose and hydroxy ethers such as the hydroxy ethyl ether of cellulose.

In the preferred process, cellulose xanthate is employed as the source of cellulosic material deposited on the fabric. For this purpose normal cellulose xanthate made by conventional methods is satisfactory. The cellulose xanthate may be dissolved in water or sodium hydroxide solution, or a more or less completely neutralized cellulose xanthate solution may be employed. In the last case the soda cellulose is preferably rather well aged before sulfurdizing. While it is generally desirable to regenerate cellulose from the cellulose xanthate, for example by decomposition with a mineral acid, before the calendering operation, such xanthate decomposition may desirably be carried out after calendering when a neutral or nearly neutral cellulose xanthate solution is employed. The concentration of cellulose in operable cellulose xanthate solutions may be widely varied depending upon such conditions as the type of fabric, construction, fabric weight and strength, the kind of finish desired and the like. Usually the cellulose content of the cellulose xanthate solution will lie in the range of 0.5 to 5 to 10 per cent more or less. If desired, a softener such as substantive, non-ionic softener may be added to the cellulose xanthate solution as well as fillers, pigments, minerals, dyestuffs, etc. This deposited cellulosic material, which remains permanently or substantially permanently in and on the fabric, makes possible calendering of the fabric with little or no damage to the yarns of the fabric to provide a more durable finish and protects the yarns against any possible deleterious effect from the catalyst employed with the termosetting resin applied in a subsequent step. In fact, the yarns in such fabrics may in some cases actually have a greater tensile strength after calendering than before.

As pointed out above, the calendering operation is preferably carried out upon a fabric which contains from about 5% to about 15% moisture, this moisture content being attained by a controlled drying operation following any of the wet operations described above. This moisture content is considerably reduced during the calendering operation, which is preferably carried out with the calender rolls at a temperature of the order of 350°–425° F. and at a total nip pressure between 10 and 60 tons. It should be noted that the fabric during the calendering operation contains substantially no ingredients which are reactive with cellulose and therefore is not subject to the deleterious effects which would otherwise occur in the presence of such reactive agents at the high temperatures and pressures employed.

If desired, the fabric may be heated immediately following the calendering operation to a temperature from about 225° F. up to approximately the scorch point in order to set the calendered finish. The time of such heating will vary inversely with the temperature employed, ranging from 1 to 60 minutes or more.

The effect of this heating step may be enhanced, if desired, by treating the fabric following the calendering operation and prior to or following a heating step with formaldehyde or a low molecular weight formaldehyde resin and an acidic catalyst, as described in our co-pending patent application Serial No. 272,263 filed February 18, 1952, now U. S. Patent No. 2,689,194. As pointed out in that application the formaldehyde may be introduced as such or may be introduced in the form of a formaldehyde donor such as para-formaldehyde or certain formals and the like. Among the low molecular weight formaldehyde thermosetting resins which may be employed, preferably wholly or partly in a water-soluble or water-dispersible state, are urea formaldehyde, thiourea formaldehyde, ketone formaldehyde, and melamine formaldehyde resins, as well as those including substituted melamines, ureas and ketones and mixtures of two or more of such resins.

The catalysts which may be employed and which serve to catalyze the reaction between formaldehyde and the cellulosic material or the further polymerization of the formaldehyde-containing resins are well known and include both alkaline catalysts such as alkali metal carbonates and the like which are particularly suitable for the ketone aldehyde resins, and acidic catalysts such as tartaric acid, lactic acid, boric acid, oxalic acid, acetic acid, formic acid, various sulfonic acids and such acidic salts as ammonium thiocyanate, ammonium acid phosphate, ammonium chloride and the like.

In general, the solution or dispersion of formaldehyde as employed for treating the fabric preferably contains from about 0.1% to 10% by weight, preferably 0.1% to 5% of formaldehyde, and the formaldehyde resin solution or dispersion is employed in a concentration of 0.5% to 30%, preferably 0.5% to 10% by weight. If desired, both formaldehyde and formaldehyde resin may be employed simultaneously.

The resin treatment described in the preceding three paragraphs is applied throughout the extent of the fabric and is not sufficient, in itself, to preserve the calendered finish of the fabric, which is removed to an appreciable extent, from the areas not otherwise protected, by a subsequent treatment with an aqueous medium as will be described hereinafter.

The next step in the present invention comprises treating selected localized fabric areas only, preferably in accordance with a predetermined pattern, with a resinous composition which is in the nature of a permanent resist. The resinous composition may be applied to the fabric in any suitable manner, as by stenciling, spraying, printing, etc. The resinous compositions employed in this step comprise such thermosetting resins as urea formaldehyde, melamine formaldehyde, and ketone formaldehyde resins as well as formaldehyde resins containing substituted and/or modified melamines, ureas, and ketones as well as mixtures of two or more of the foregoing. The resinous composition may also include any one or more of the usual thickeners, softeners, pigments, fillers and dyestuffs. The composition also preferably includes a suitable acidic or alkaline catalyst for the further polymerization of the resin such as any one or more of the catalysts described above.

It is preferred to employ a water-repellent material in the resinous composition, such as fatty or waxy materials, for example, higher fatty acids and their compounds, stearamides, lauramides and the like or water-repellent compositions such as those described in U. S. Patent 2,491,249 issued December 13, 1949.

When it is desired to produce the maximum glazed brilliance in the pattern printed areas of the fabric, the all over resin treatment and/or the printed resin pattern may employ solvents which have substantially no swelling effect upon cellulosic materials, such as non-aqueous, or only partly aqueous solvents for the resins used. Suitable solvents include a wide variety of organic materials such as liquid aliphatic and aromatic compounds and their mixtures. Aliphatic alcohols, ketones and esters may be employed, as well as such aromatic compounds as benzene and the xylenes, but preferably those aliphatic compounds containing no more than eight carbon atoms. The methyl, ethyl, propyl, and butyl alcohols are particularly desirable. In the case of solvents which are water-miscible, aqueous mixtures of the organic solvent containing up to 50% by weight of water, or whatever lesser amount is miscible with the organic solvent, may be employed. Various thermosetting resins may be employed in the essentially organic media, e. g. resins made by reacting formaldehyde or other aldehydes such as glyoxal with urea, thiourea, melamine or substituted ureas, melamines, ketones and the like. Alkylated melamine-formaldehyde resins, e. g. methylated-, ethylated-, propylated-, melamine resins and such resins with even longer alkyl chains, may be especially suitable.

Standard resin catalysts which are soluble, or at least dispersible, in the organic or aqueous-organic liquids employed may be used, e. g. tartaric acid, benzoic acid, salicylic acid, various sulfonic acids, amine hydro-chlorides, also salts such as ammonium thiocyanate, etc. Alkaline substances such as alkali metal hydroxides or carbonates are suitable polymerization catalysts for the ketone aldehyde resins when dissolved in suitable organic solvents.

The amount of resinous composition applied to the localized areas of fabric may be varied quite widely, as can readily be understood. When applied to the fabric by printing or stenciling, the amount of resinous material in the printing paste will usually lie within the range from 5% to 40% by weight, the exact amount depending, among other things, upon the nature of the fabric, the design, the finish desired, etc. This resin treatment provides substantially permanent protection for the calendered finish in the underlying localized areas. The finish in these areas is not substantially removed by the subsequent treatment with an aqueous medium because of the additional protection afforded by this localized resin coating as well as by the water-repellent material which is preferably employed as described above.

Following application of the resinous composition to the fabric as described above, the fabric is then heated at a temperature and for a time sufficient to cause curing or setting of the resin. While the exact time and temperature will vary considerably depending upon the particular resin and catalyst employed, in general the temperature will range from about 225° F. up to the scorch point and the time, which varies inversely with the temperature, will range from 1 to 60 minutes or more.

The step of removing or reducing the calendered finish on unprotected portions of the fabric surface which were not contacted by the resinous printing paste composition during the immediately preceding step may be carried out merely by treating the fabric with water, preferably at an elevated temperature. However, it is usually desirable to scour the fabric with aqueous alkaline media containing, for example, detergents, alkali, alkali carbonates, alkali borates, alkali phosphates, alkali silicates, and the like. Greater effects may be obtained by employing strong aqueous alkaline solutions as, for example, aqueous caustic soda solutions of mercerizing strength espectially when resin is also present in the non-patterned fabric areas. In general, best results are obtained using aqueous solutions of sodium hydroxide in the range from 20° Tw. to 90° Tw. Concentrations outside this range may be used, however, particularly when employed at temperatures below or above room temperature. Instead of sodium hydroxide there may also be employed potassium hydroxide, lithium hydroxide, quaternary ammonium hydroxide and the like. The fabric may be either wet or dry at the beginning of this step and may be maintained under tension or in a relaxed condition during this step depending upon the results desired.

The following specific examples are illustrative of the scope of the present invention but are not intended to place any limitations thereon.

*Example 1*

A bleached cotton fabric counting 88 x 80, weighing 6.90 yards per pound, and having a greige width of 40 inches, was impregnated in a mangle with an aqueous solution of 60° Tw. sodium hydroxide, squeezed to a pick-up of about 100% and allowed to stand in a slack condition for about 10 minutes. Then the fabric was thoroughly washed, first with hot and then with cold water, squeezed off and partially dried by passing through a heated tenter frame at near griege width; the fabric as it emerged from the frame carried about 10% to 15% moisture and was immediately glazed by passing it three times through a friction calender heated to 375° F. and exerting a total nip pressure of 40 tons.

Following this operation the calendered fabric was set in the calendered condition by passage through a hot air curing chamber in which the fabric was maintained at 350° F. for two minutes. Following this operation the calendered fabric was impregnated in a mangle with an aqueous solution containing 12% urea-formaldehyde resin (largely water-dispersible low molecular weight polymer), 5% of softener, and 0.1% isopropylaminehydrochloride as catalyst. The pickup was about 50%. The resin impregnated fabric was substantially dried by passing it through a tenter frame heated to about 260° F. Thereafter it was passed through a hot air curing chamber in which the fabric was maintained at 350° F. for two minutes to cure or set the resin.

The cured, glazed fabric was now printed on a textile fabric printing machine using a pattern engraved roller which printed upon the fabric in a pattern a paste of the following composition:

| | Pounds |
|---|---|
| Melamine formaldehyde low molecular weight polymer (80% aqueous solution) | 15.0 |
| Methyl cellulose ether (5% aqueous solution) | 65.0 |
| Isopropylaminehydrochloride catalyst (30% aqueous solution) | 1.0 |
| Softener (fatty carbamide) | 15.0 |
| Water | 4.0 |

The printed fabric was dried on low pressure steam heated cylinders, then cured in a chamber heated to 350° F. for two minutes.

The fabric was wet out with water, squeezed to about a 50% pick-up and then impregnated in a mangle with a 60° Tw. aqueous caustic soda solution. The pick-up was about 100%. The impregnated fabric was allowed to stand in a slack, untensioned condition for about 25 minutes. Then the alikali treated fabric was thoroughly washed, first with hot and then with cold water, squeezed off and dried on a heated tenter frame.

The finished fabric was characterized by a brilliant, glazed pattern in those areas which were covered by the printing paste, adjacent to non-lustrous compacted fabric areas. The fabric had an embossed appearance due to the fact that the glazed areas of the fabric were somewhat raised or depressed from the plane of the fabric as represented by the non-lustrous compacted fabric areas. The fabric possessed good anti-crease qualities.

*Example 2*

The fabric and treatment were the same as in Example 1, except that the resinous printing paste had the following composition:

| | Pounds |
|---|---|
| Melamine formaldehyde low molecular weight polymer (80% aqueous solution) | 25.00 |
| Stearamide | 0.75 |
| Sodium stearate | 0.05 |
| Ammonium hydroxide (26% aqueous solution) | 0.30 |
| Methyl cellulose ether (5% aqueous solution) | 70.0 |
| Isopropylaminehydrochloride catalyst (30% aqueous solution) | 2.0 |
| Water | 1.9 |

The fabric produced was similar to that in Example 1.

*Example 3*

The fabric and treatment were the same as in Example 1, except that the calendered fabric was impregnated not with a urea-formaldehyde resin but with a 5% aqueous solution of formaldehyde containing 0.3% ammonium thiocyanate. The fabric produced was similar to that in Example 1.

*Example 4*

The fabric and treatment were the same as in Example 1, except that the fabric was printed with the resin pattern immediately after the calendering operation so that the urea-formaldehyde resin treatment of Example 1 and the curing steps preceding and following this resin treatment were all omitted. The fabric produced was similar to that in Example 1, except that the fabric areas not treated with resin had no enhanced anti-crease properties.

*Example 5*

The fabric and the treatment were the same as in Example 4, except that the fabric was cured for two minutes at 35° F. following the calendering operation and prior to printing with the resin. The fabric produced was similar to that of Example 4.

*Example 6*

The fabric and treatment were the same as in Example 4, except that following the final step the fabric was impregnated in a mangle with an aqueous solution containing 10% low molecular weight melamine-formaldehyde resin and 0.3% isopropylaminehydrochloride. After drying on a tenter frame at 260° F., the fabric was then scoured in an aqueous bath containing 0.5% sulfonated higher fatty alcohol detergent, and 0.2% ammonia. After a thorough washing with hot, then cold water, the fabric was squeezed and hot framed to dry it. The fabric was in general quite similar to that produced in Example 1.

*Example 7*

The fabric and treatment were the same as in Example 5 except that before calendering the bleached cotton fabric was not shrunk with caustic soda solution but was simply wet out with water, squeezed and dried in a tenter frame to a moisture content of 10% to 15%. The fabric produced was similar to that of Example 5.

*Example 8*

A bleached cotton fabric having the same construction as Example 1 was impregnated in a mangle with an aqueous cellulose xanthate composition containing 3.0% cellulose (present as the cellulose in the xanthate), 2.5% sodium hydroxide and 2.0% of a substantive, non-ionic softener. In addition, the bath contained products of the xanthation reaction. The pick-up from the bath was about 50%.

The impregnated fabric was run without drying into a bath of 10% sulfuric acid in which the xanthate was decomposed leaving regenerated cellulose in and on the fabric. The acid treated fabric was thoroughly washed first with hot and then wtih cold water, squeezed off and partially dried by passing through a heated tenter frame at near greige width; the fabric as it emerged from the frame carried about 10% to 15% moisture and was immediately glazed by passing it three times through a friction calender heated to 375° F. and exerting a total nip pressure of 40 tons.

Following this operation the calendered fabric was impregnated in a mangle with an aqueous solution containing 12% urea-formaldehyde resin (largely water-dispersible low molecular weight polymer), 5% of softener and 0.1% isopropylaminehydrochloride catalyst. The pick-up was about 50%. The resin impregnated fabric was substantially dried by passing it through a tenter frame heated to about 260° F. Thereafter the treatment was the same as in Example 1.

The finished fabric was characterized by a brilliant, glazed pattern in those areas which were covered by the printing paste adjacent to non-lustrous, compacted fabric areas. The fabric had an embossed appearance due to the fact that the glazed areas of the fabric were somewhat raised or depressed from the plane of the fabric as represented by the non-lustrous, compacted fabric areas. The fabric possessed good anti-crease qualities.

Example 9

The fabric and treatment were the same as in Example 8 except that the resinous printing paste had the following composition:

| | Pounds |
|---|---|
| Melamine formaldehyde low molecular weight polymer (80% aqueous solution) | 25.0 |
| Stearamide | 0.75 |
| Sodium stearate | 0.05 |
| Ammonium hydroxide (26% aqueous solution) | 0.30 |
| Methyl cellulose ether (5% aqueous solution) | 70.0 |
| Isopropylaminehydrochloride catalyst (30% aqueous solution) | 2.0 |
| Water | 1.9 |

The fabric produced was similar to that in Example 8.

Example 10

The fabric and treatment were the same as in Example 8, except that the calendered fabric was impregnated not with a resin but with a 5% aqueous solution of formaldehyde containing 0.3% ammonium thiocyanate. The fabric produced was similar to that in Example 8.

Example 11

The fabric and treatment were the same as in Example 8, except that the fabric was printed with the resin pattern immediately after the calendering operation so that the urea-formaldehyde resin treatment of Example 8 and the curing step normally following this resin treatment were omitted. The fabric produced was similar to that in Example 8 except that the fabric areas not treated with resin had no enhanced anti-crease properties.

Example 12

The fabric and the treatment were the same as in Example 11, except that the fabric was cured for two minutes at 350° F. following the calendering operation and prior to printing with the resin. The fabric produced was similar to that of Example 11.

Example 13

The fabric and treatment were the same as in Example 11, except that following the final step the fabric was impregnated in a mangle with an aqueous solution containing 10% low molecular weight melamine-formaldehyde resin and 0.3% isopropylaminehydrochloride. After drying on a tenter frame at 260° F. the fabric was cured for two minutes at 350° F. The fabric was then scoured in an aqueous bath containing 0.5% sulfonated higher fatty alcohol detergent, and 0.2% ammonia. After a thorough washing with hot, then cold water, the fabric was squeezed and hot framed to dry it. The fabric in general was quite similar to that produced in Example 8.

Example 14

A bleached cotton fabric counting 76 x 72, weighing 9 yards per pound, and having a greige width of 39 inches, was wet out with water then partially dried by passing through a heated tenter frame at near greige width. The fabric as it emerged from the frame carried about 10% to 15% moisture and was immediately glazed by passing it three times through a friction calender heated to 385° F. and exerting a total nip pressure of 40 tons.

Following this operation the calendered fabric was impregnated in a mangle with a bath of the following composition:

| | |
|---|---|
| Urea-formaldehyde resin (low molecular weight polymer, 50% aqueous solution)_____lbs__ | 20.0 |
| Isopropylamine hydrochloride (30% aqueous solution) catalyst_____lb__ | 1.0 |
| Isopropyl alcohol_____gals__ | 10.0 |

The resin bath pickup was about 40%. The resin treated fabric was now dried at a relatively low temperature, and then cured by passing around a series of cans steam heated to 325° F. at such a rate as to provide a curing time of one and one-half minutes. The cured glazed fabric was now printed on a textile fabric printing machine using a pattern engraved roller which printed upon the fabric in a pattern a paste of the following composition:

| | Pounds |
|---|---|
| Butylated methylol melamine resin | 50.0 |
| Butanol | 25.0 |
| Xylol | 25.0 |
| Blue dyestuff, Color Index Pr-228 | 5.0 |

The printed fabric was dried on low pressure steam heated cylinders, then cured for two minutes in a chamber heated to 350° F.

The fabric was wet out with water, squeezed to about a 50% pickup and then impregnated in a mangle with a 90° Tw. aqueous caustic soda solution. The pickup was adjusted to about 100%. The impregnated fabric was allowed to stand in a slack, untensioned condition for about 15 minutes, then the alkali treated fabric was thoroughly washed, first with hot and then with cold water, squeezed off and dried on a slack drier.

The finished fabric was characterized by an especially brilliant, colored glazed pattern in those areas which were coated with the printing paste adjacent to non-lustrous compacted fabric areas. The fabric had an embossed appearance due to the fact that the glazed areas of the fabric were somewhat raised or depressed from the plane of the fabric as represented by the non-lustrous compacted fabric areas. The fabric possessed fair anti-crease properties.

Example 15

The fabric and treatment were the same as in Example 14, except that the all over resin treatment following the glazing and prior to printing was omitted. The fabric produced was similar to that in Example 14 but had no enhanced anti-crease properties.

Example 16

The fabric and treatment were the same as in Example 14, except that the resinous printing paste of Example 14 was replaced by a printing paste of the following composition:

| | Pounds |
|---|---|
| Melamine formaldehyde low molecular weight polymer (80% aqueous solution) | 15.0 |
| Methyl cellulose ether (5% aqueous solution) | 65.0 |
| Isopropylamine hydrochloride catalyst (30% aqueous solution) | 1.0 |
| Softener (fatty carbamide) | 15.0 |
| Pigment lake, Color Index Pr. 406 | 5.0 |
| Water | 4.0 |

The fabric produced was similar to that in Example 14.

*Example 17*

The fabric and treatment were the same as in Example 1, except that the resinous printing paste had the following composition:

| | Pounds |
|---|---|
| Melamine formaldehyde low molecular weight polymer (80% aqueous solution) | 15.0 |
| Methyl cellulose ether (5% aqueous solution) | 65.0 |
| Isopropylamine hydrochloride catalyst (30% aqueous solution) | 1.0 |
| Red dyestuff—Color Index Pr. 101 | 5.0 |
| Softener (fatty carbamide) | 15.0 |
| Water | 4.0 |

The fabric produced was similar to that in Example 1, except that the glazed pattern fabric areas were colored red.

*Example 18*

The fabric and treatment were the same as in Example 8, except that the resinous printing paste of Example 17 was substituted for that in Example 8. The fabric produced was similar to that in Example 8, except that the glazed pattern fabric areas were colored red.

*Example 19*

The fabrics and treatments were the same as in each of the preceding Examples 1 to 18 inclusive, except that the resinous printing paste was not applied to the glazed fabric by printing, but was applied in pattern form to the fabric by means of a continuous stenciling machine. The fabrics produced were generally similar to those in the preceding examples but were characterized by having somewhat more heavily coated and more lustrous glazed areas which when colored exhibited a more dense uniform color.

Although we have herein described specific embodiments of our invention, we do not intend to limit ourselves solely thereto but to include all of the obvious modifications and variations within the spirit and scope of the appended claims.

We claim:

1. The method of making pattern-calendered cellulosic textile fabric which comprises calendering said fabric, impregnating selected areas of the calendered fabric in the desired pattern at least once with a low molecular weight thermosetting resin and a catalyst from a liquid medium which has substantially no swelling effect upon cellulosic materials, curing said resin to form a permanent resist in the selected areas, and treating the fabric with an aqueous medium to remove at least part of the calendered finish in areas outside said selected areas.

2. The method of making pattern-calendered cellulosic textile fabric which comprises calendering said fabric, heating the calendered fabric to set the calendered finish, impregnating selected areas of the calendered fabric in the desired pattern at least once with a low molecular weight thermosetting resin and a catalyst from a liquid medium which has substantially no swelling effect upon cellulosic materials, curing said resin to form a permanent resist in the selected areas, and treating the fabric with an aqueous medium to remove at least part of the calendered finish in areas outside said selected areas.

3. The method of making pattern-calendered cellulosic textile fabric which comprises depositing a cellulosic material on said fabric substantially throughout its extent, calendering said fabric, impregnating selected areas of the calendered fabric in the desired pattern at least once with a low molecular weight thermosetting resin and a catalyst from a liquid medium which has substantially no swelling effect upon cellulosic materials, curing said resin to form a permanent resist in the selected areas, and treating the fabric with an aqueous medium to remove at least part of the calendered finish in areas outside said selected areas.

4. The method of making pattern-calendered cellulosic textile fabric which comprises calendering said fabric, impregnating said fabric substantially throughout its extent with a low molecular weight thermosetting resin and a catalyst, said resin being applied in said impregnating steps from a liquid medium which has substantially no swelling effect upon cellulosic materials, heating the impregnated fabric to cure said resin and set said calendered finish, impregnating selected areas of the fabric in the desired pattern with a low molecular weight thermosetting resin and a catalyst, curing said resin to form a permanent resist in the selected areas, and treating the fabric with an aqueous medium to remove at least part of the calendered finish outside of said selected areas.

5. The method of making pattern-calendered cellulosic textile fabric which comprises depositing a cellulosic material on said fabric substantially throughout its extent from an aqueous medium, calendering said fabric, impregnating selected areas of the calendered fabric in the desired pattern at least once with a low molecular weight thermosetting resin and a catalyst from a liquid medium which has substantially no swelling effect upon cellulosic materials, curing said resin to form a permanent resist in the selected areas, and treating the fabric with an aqueous medium to remove at least part of the calendered finish outside of said selected areas.

6. The method of making pattern-calendered cellulosic textile fabric which comprises impregnating said fabric substantially throughout its extent with an aqueous solution comprising cellulose xanthate, treating the impregnated fabric with a cellulose regenerating agent, calendering said fabric, impregnating selected areas of the calendered fabric in the desired pattern at least once with a low molecular weight thermosetting resin and a catalyst from a liquid medium which has substantially no swelling effect upon cellulosic materials, curing said resin to form a permanent resist in the selected areas, and treating the fabric with an aqueous medium to remove at least part of the calendered finish outside of said selected areas.

7. The method of making pattern-calendered cellulosic textile fabric which comprises impregnating said fabric substantially throughout its extent with cellulose xanthate from an aqueous medium, treating the impregnated fabric with a cellulose regenerating agent, calendering said fabric, heating said fabric to set the calendered finish, impregnating the calendered fabric substantially throughout its extent with a low molecular weight thermosetting resin and a catalyst from a liquid medium which has substantially no swelling effect upon cellulosic materials, heating the impregnated fabric to cure the resin, impregnating selected areas only of the fabric in the desired pattern with a low molecular weight thermosetting resin and a catalyst, curing said resin to form a permanent resist in the selected areas, and treating the fabric with an aqueous medium to remove at least part of the calendered finish outside of said selected areas.

8. The method of making pattern-calendered cellulosic textile fabric which comprises calendering said fabric, impregnating said fabric substantially throughout its extent with formaldehyde and a catalyst from a liquid medium which has substantially no swelling effect upon cellulosic materials, heating the impregnated fabric to react the formaldehyde with the fabric and set said calendered finish, impregnating selected areas of the fabric in the desired pattern with a low molecular weight thermosetting resin and a catalyst, curing said resin to form a permanent resist in the selected areas, and treating the fabric with an aqueous medium to remove at least part of the calendered finish outside of said selected areas.

9. The method of making pattern-calendered cellulosic textile fabric which comprises impregnating said fabric substantially throughout its extent with cellulose xanthate from an aqueous medium, treating the impregnated fabric with a cellulose regenerating agent, calendering said fabric, impregnating said fabric substantially throughout its extent with formaldehyde and a catalyst from a liquid medium which has substantially no swelling effect upon cellulosic materials, heating the impregnated fabric to react the formaldehyde with the regenerated cellulose and set said calendered finish, impregnating selected areas of the fabric in the desired pattern with a low molecular weight thermosetting resin and a catalyst, curing said resin to form a permanent resist in the selected areas, and treating the fabric with an aqueous medium to remove at least part of the calendered finish outside of said selected areas.

10. The method of claim 7 in which the fabric is treated with an aqueous alkaline medium to remove part of the calendered finish.

11. The method of claim 7 in which the fabric is treated with an aqueous solution of sodium hydroxide in the range from 20° Tw. to 90° Tw. to remove at least part of the calendered finish.

12. The method of making pattern-calendered cellulosic textile fabric which comprises impregnating said fabric substantially throughout its extent with cellulose xanthate from an aqueous medium, treating the impregnated fabric with a cellulose regenerating agent, calendering said fabric, heating said fabric to set the calendered finish, impregnating the calendered fabric substantially throughout its extent with a low molecular weight thermosetting resin and a catalyst from a liquid medium which has substantially no swelling effect upon cellulosic materials, heating the impregnated fabric to cure the resin, impregnating selected areas only of the fabric in the desired pattern with a low molecular weight thermosetting resin and a catalyst from a liquid medium having substantially no swelling effect upon cellulosic materials, curing said resin to form a permanent resist in the selected areas, and treating the fabric with an aqueous medium to remove at least part of the calendered finish outside of said selected areas.

13. The method as defined in claim 12 in which said non-swelling liquid medium is an alcoholic medium.

14. The method as defined in claim 13 in which the last-named aqueous medium for removing the calendered finish is alkaline.

References Cited in the file of this patent

UNITED STATES PATENTS

| | | |
|---|---|---|
| 2,504,857 | MacIntyre | Apr. 18, 1950 |

FOREIGN PATENTS

| | | |
|---|---|---|
| 9,849 | Great Britain | 1903 |
| 425,032 | Great Britain | Mar. 6, 1935 |

OTHER REFERENCES

Sylvania Industrial Corporation (Br.), Sept. 11, 1947.